US011312451B2

(12) United States Patent
Mangano

(10) Patent No.: US 11,312,451 B2
(45) Date of Patent: Apr. 26, 2022

(54) SYSTEMS, DEVICES, AND/OR METHODS FOR IMPROVING WATERCRAFT PERFORMANCE

(71) Applicant: James Irving Mangano, San Diego, CA (US)

(72) Inventor: James Irving Mangano, San Diego, CA (US)

( * ) Notice: Subject to any disclaimer, the term of this patent is extended or adjusted under 35 U.S.C. 154(b) by 231 days.

(21) Appl. No.: 15/728,423

(22) Filed: Oct. 9, 2017

(65) Prior Publication Data

US 2018/0099729 A1 Apr. 12, 2018

Related U.S. Application Data

(60) Provisional application No. 62/406,020, filed on Oct. 10, 2016.

(51) Int. Cl.
| | | |
|---|---|---|
| *B63B 1/32* | (2006.01) | |
| *B63B 32/50* | (2020.01) | |
| *B63B 32/57* | (2020.01) | |
| *B63B 32/40* | (2020.01) | |

(52) U.S. Cl.
CPC ............... *B63B 1/32* (2013.01); *B63B 32/40* (2020.02); *B63B 32/50* (2020.02); *B63B 32/57* (2020.02)

(58) Field of Classification Search
CPC . B63B 35/79; B63B 35/7906; B63B 35/7909; B63B 35/7923; B63B 35/7926; B63B 2035/79; B63B 2035/7903
USPC .............................................. 441/65, 74, 79
See application file for complete search history.

(56) References Cited

U.S. PATENT DOCUMENTS

| | | | | | |
|---|---|---|---|---|---|
| 3,090,978 | A | * | 5/1963 | Hanson ................... | B63B 35/85 441/70 |
| 3,121,890 | A | * | 2/1964 | Rumsey, Jr. ............ | B63B 35/81 114/274 |
| 3,182,341 | A | * | 5/1965 | Rieffie .................... | B63B 35/81 114/281 |
| 3,319,276 | A | * | 5/1967 | Penney ................... | B63B 35/81 441/68 |
| 3,747,138 | A | * | 7/1973 | Morgan ............. | B63B 35/7923 114/281 |
| 4,320,546 | A | * | 3/1982 | Knox ..................... | B63B 35/793 114/274 |
| 4,752,262 | A | * | 6/1988 | Martinmaas ........ | B63B 35/7926 114/126 |
| 5,062,378 | A | * | 11/1991 | Bateman ............. | B63B 35/7923 114/274 |
| 5,309,859 | A | * | 5/1994 | Miller .................. | B63B 35/7923 114/274 |
| 5,957,742 | A | * | 9/1999 | Brennan ............. | B63B 35/7926 441/74 |
| 7,144,285 | B1 | * | 12/2006 | Hendricks ................ | B63B 1/24 441/74 |

(Continued)

*Primary Examiner* — Daniel V Venne
(74) *Attorney, Agent, or Firm* — Dale Jensen, PLC; Dale Jensen

(57) ABSTRACT

Certain exemplary embodiments can provide a system comprising a plurality of discs coupleable to a first watercraft. Wherein, when the plurality of discs is coupled to the first watercraft, each of the plurality of discs deflects a flow of water along the first watercraft such that a partial hydrodynamic lift results as the first watercraft moves across a water surface compared to a second watercraft, the second watercraft not coupled to discs.

11 Claims, 11 Drawing Sheets

(56) References Cited

U.S. PATENT DOCUMENTS

2004/0092180 A1* 5/2004 Turkington ......... B63B 35/7926
  441/79
2009/0029610 A1* 1/2009 Rourman ................ B63B 1/242
  441/79

* cited by examiner

SYSTEMS, DEVICES, AND/OR METHODS FOR IMPROVING WATERCRAFT PERFORMANCE

CROSS-REFERENCES TO RELATED APPLICATIONS

This application claims priority to, and incorporates by reference herein in its entirety, pending U.S. Provisional Patent Application Ser. No. 62/406020, filed Oct. 10, 2016.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system comprising a plurality of discs coupleable to a first watercraft. Wherein, when the plurality of discs is coupled to the first watercraft, each of the plurality of discs deflects a flow of water along the first watercraft such that a partial hydrodynamic lift results as the first watercraft moves across a water surface compared to a second watercraft, the second watercraft not coupled to discs.

Certain exemplary embodiments provide improvements to watercrafts, e.g., surfboards, boats, jet skis, and/or any systems with a wetted hull (e.g., planing hulls) etc. Certain exemplary discs, which can be called Hydro Dynamic Lift Deflector ("HDLD") discs, can be coupled to a surfboard to improve performance. With a set of a plurality of HDLD discs coupled thereto, the watercraft can deflect a flow of water along the surfboard such that the surfboard rides higher relative to a water surface as compared to a surfboard without HDLD discs coupled thereto. When properly installed, all other things being equal, the HDLD discs reduce friction of the watercraft with water and thereby increase the speed or forward velocity of the watercraft.

Certain exemplary embodiments provide a watercraft that is coupled to four (4) HDLD discs with a certain design shape. The HDLD discs are placed on bottom outer edges in predetermined location on the watercraft. The HDLD discs initiate a lift creating a partial hydrodynamic and/or dynamic lift of the watercraft.

Certain exemplary embodiments increase an overall speed or forward velocity of a watercraft compared to what would otherwise be possible without HDLD discs. HDLD discs, when properly installed, reduce friction over a bottom of a wetted surface of the watercraft, which results in increased forward velocity.

Figure 1:
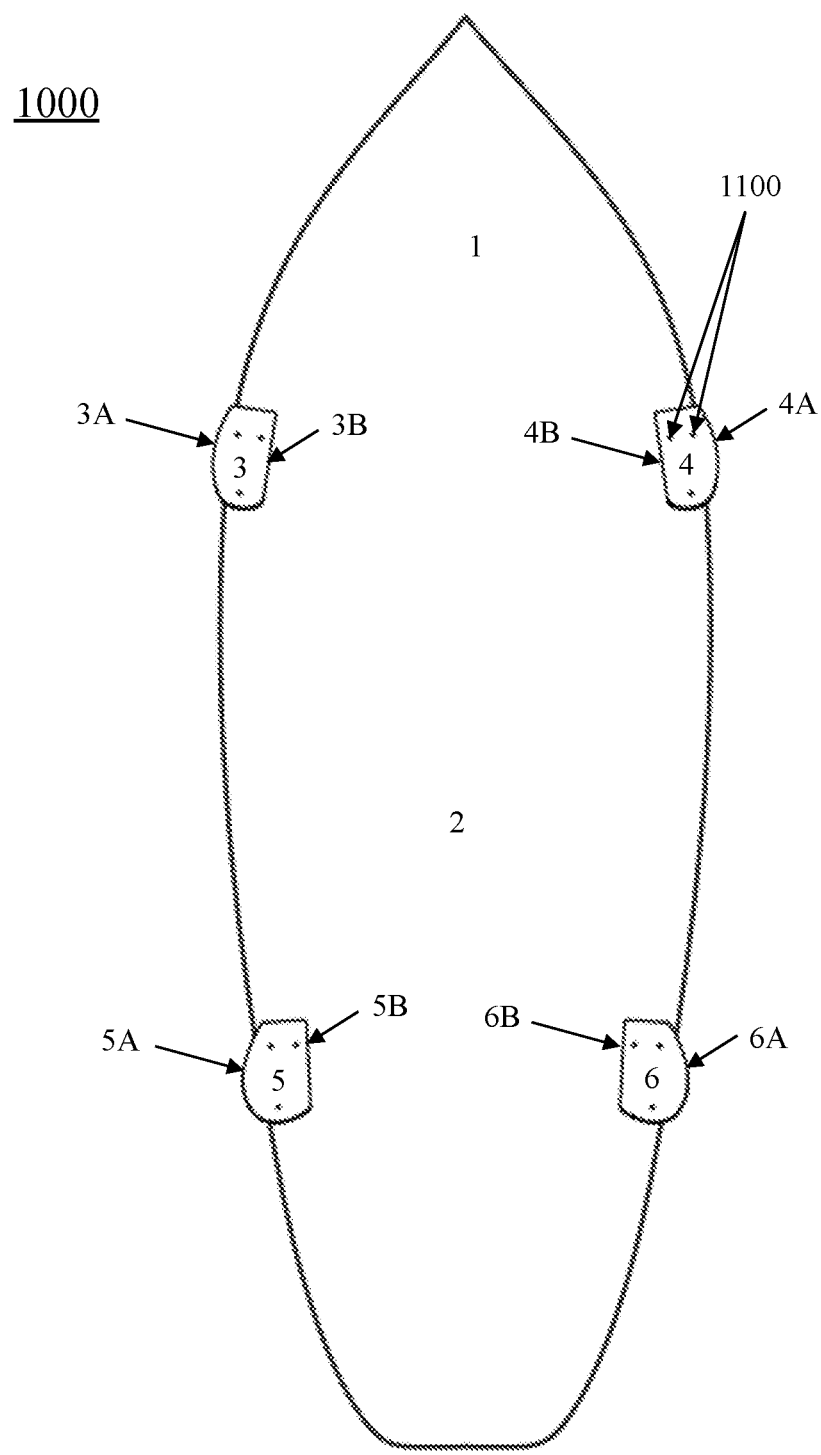
FIG. 1 is a bottom view of an exemplary embodiment of a system 1000.
Figure 2A:
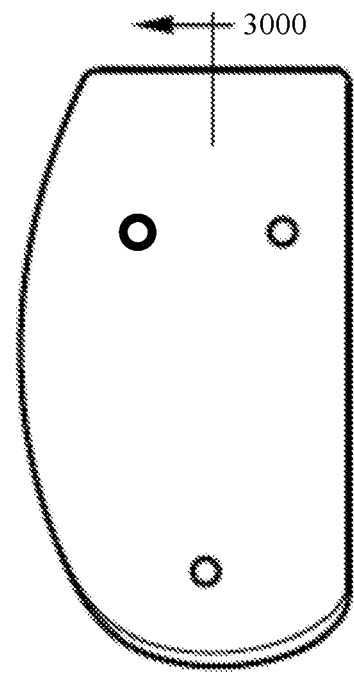
FIGS. 2A, 2B, 2C and 2D are top views of exemplary discs 3, 4, 5, and 6 respectively of FIG. 1.
Figure 2B:
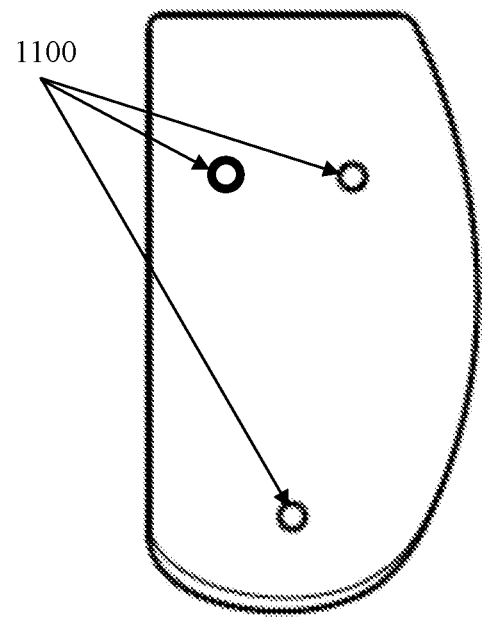
Figure 2C:
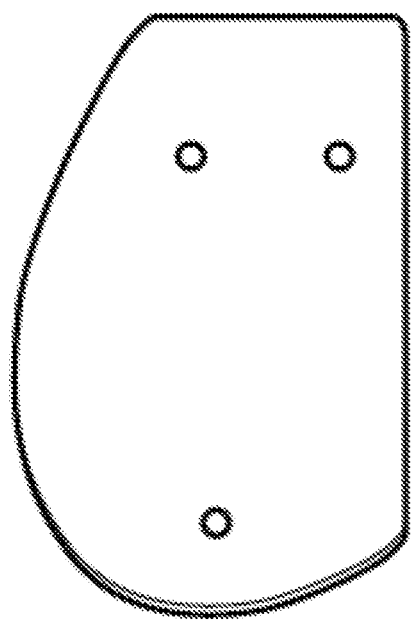
Figure 2D:
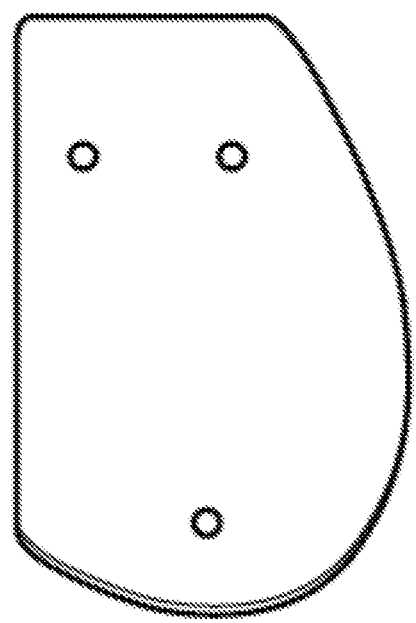

FIG. 1 is a bottom view of an exemplary embodiment of a system 1000, which comprises a watercraft 1, which can be a surfboard; coupled to four (4) discs 3, 4, 5, and 6. Discs 3, 4, 5, and 6 are installed on a bottom surface 2 of watercraft 1. From the point of view illustrated in FIG. 1, Discs 3, 4, 5, and 6 are installed as illustrated with an outside edge 3A, 4A, 5A, and 6A of each respective disc extending past edges of watercraft 1. Discs 3, 4, 5, and 6 are installed as illustrated with respective inside edges 3B, 4B, 5B, and 6B of positioned inside edges of watercraft 1.

In certain exemplary embodiments, each of discs 3, 4, 5, and 6 define a plurality of apertures 1100 via which discs 3, 4, 5, and 6 can be coupled to watercraft 1 via fasteners Certain exemplary embodiments provide a first surfboard (e.g., watercraft 1). A plurality of discs 3, 4, 5, and 6 are coupleable to the first surfboard, wherein, when plurality of discs 3, 4, 5, and 6 are coupled to the first surfboard, each of the plurality of discs deflects a flow of water along the first surfboard such that the first surfboard rides higher relative to a water surface compared to a second surfboard not coupled to discs.

When coupled to the surfboard, plurality of discs 3, 4, 5, and 6 create a partial hydrodynamic lift as the surfboard moves on water. Plurality of discs 3, 4, 5, and 6 cause the system to have less friction moving through water as compared to the second surfboard not coupled to discs. Each of plurality of discs 3, 4, 5, and 6 can be partially circular (see discs 73, 74, 75, and 76 of FIG. 7). Each of plurality of discs 3, 4, 5, and 6 can comprise three edges, wherein two of the three edges are substantially parallel to each other (see discs 43, 44, 45, and 46 of FIG. 4). Each of plurality of discs 3, 4, 5, and 6 can comprise a curvilinear edge (see, e.g., outside edges 3A, 4A, 5A, and 6A of FIG. 1). Each of plurality of discs 3, 4, 5, and 6 can have a tapered cross-section (see, e.g., FIG. 3A and FIG. 3B). The plurality of discs can comprise four discs spaced over a surface of the surfboard as illustrated in FIG. 1.

Certain exemplary embodiments provide plurality of discs 3, 4, 5, and 6 coupleable to first watercraft 1, wherein, when plurality of discs 3, 4, 5, and 6 is coupled to first watercraft. Each of plurality of discs 3, 4, 5, and 6 deflects a flow of water along first watercraft 1 such that a partial hydrodynamic lift results as first watercraft 1 moves across a water surface compared to a second watercraft, the second watercraft not coupled to discs.

FIGS. 2A, 2B, 2C and 2D are top views of exemplary discs 3, 4, 5, and 6 respectively of FIG. 1.

Figure 3A:
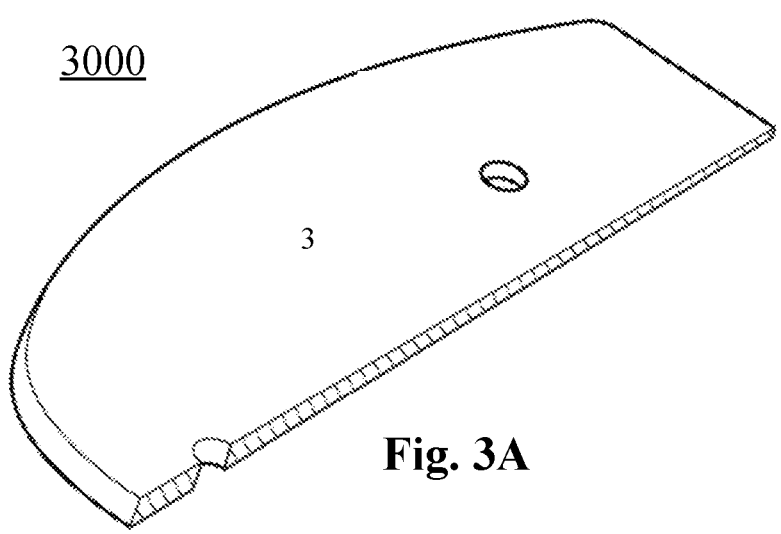
FIG. 3A is a sectional view 3000 (see FIG. 2A) of exemplary disc 3 of FIG. 1.

FIG. 3A is a sectional view 3000 (see FIG. 2A) of exemplary disc 3 of FIG. 1.

Figure 3B:
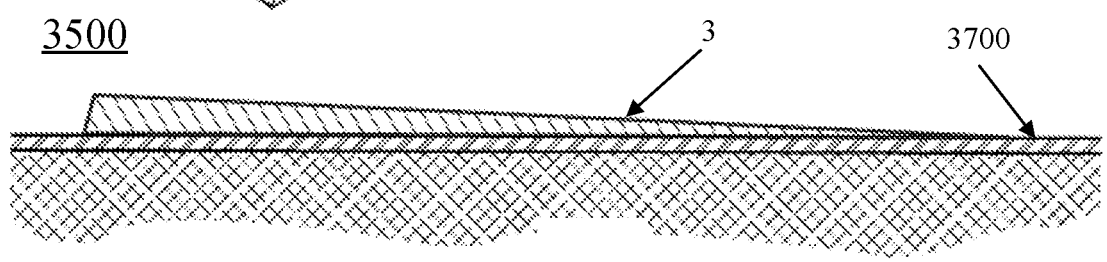
FIG. 3B is a sectional view of an exemplary system 3500.

FIG. 3B is a sectional view of an exemplary system 3500, which illustrates and exemplary disc 3 (of FIG. 3A) coupled to a surface of a watercraft 3700. As illustrated, disc 3 is tapered.

Figure 4:
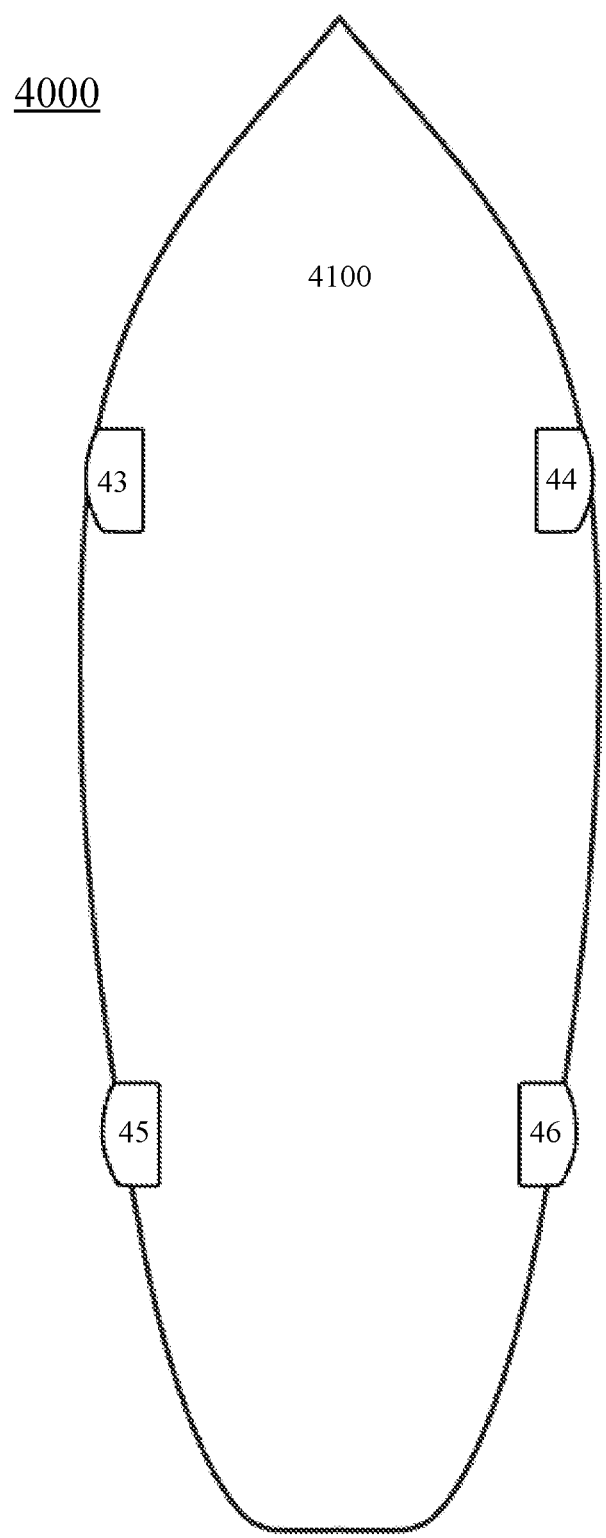
FIG. 4 is a bottom view of an exemplary embodiment of a system 4000.
Figure 5A:
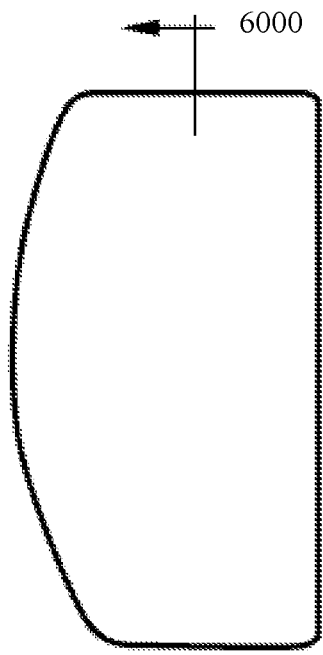
FIGS. 5A, 5B, 5C and 5D are top views of exemplary discs 43, 34, 45, and 46 respectively of FIG. 4.
Figure 5B:
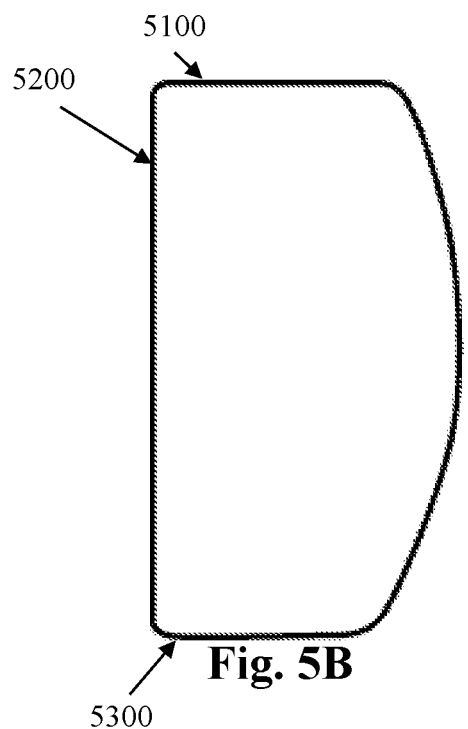
Figure 5C:
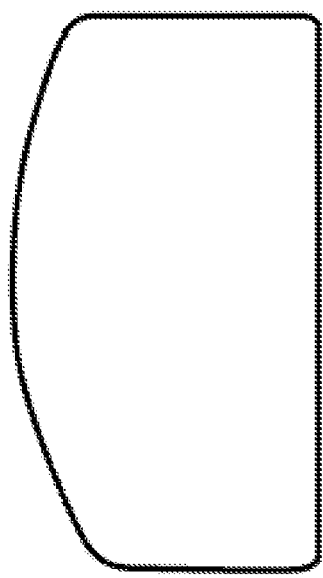
Figure 5D:
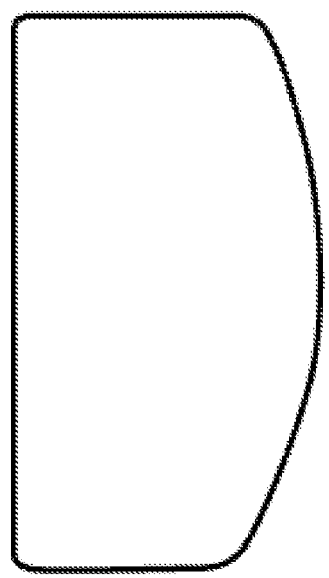

FIG. 4 is a bottom view of an exemplary embodiment of a system 4000, which comprises a surfboard with exemplary discs 43, 34, 45, and 46 installed thereon. In certain exemplary embodiments, discs 43, 34, 45, and 46 can be glued to watercraft 4100. In certain exemplary embodiments, discs 43, 34, 45, and 46 can be coupled to watercraft 4100 via fiberglass and/or polymers. In certain exemplary embodiments, discs 43, 34, 45, and 46 can be coupled to watercraft 4100 via heating and melt coupling.

FIGS. 5A, 5B, 5C and 5D are top views of exemplary discs 43, 34, 45, and 46 respectively of FIG. 4. Each of plurality of discs 43, 34, 45, and 46 can comprise three edges, first edge 5100, second edge 5200, and third edge 5300. Two of the three edges, first edge 5100 and third edge 5300, are substantially parallel to each other. Each of first edge 5100 and third edge 5300 is substantially perpendicular to second edge 5200.

Figures 6A, 6B:
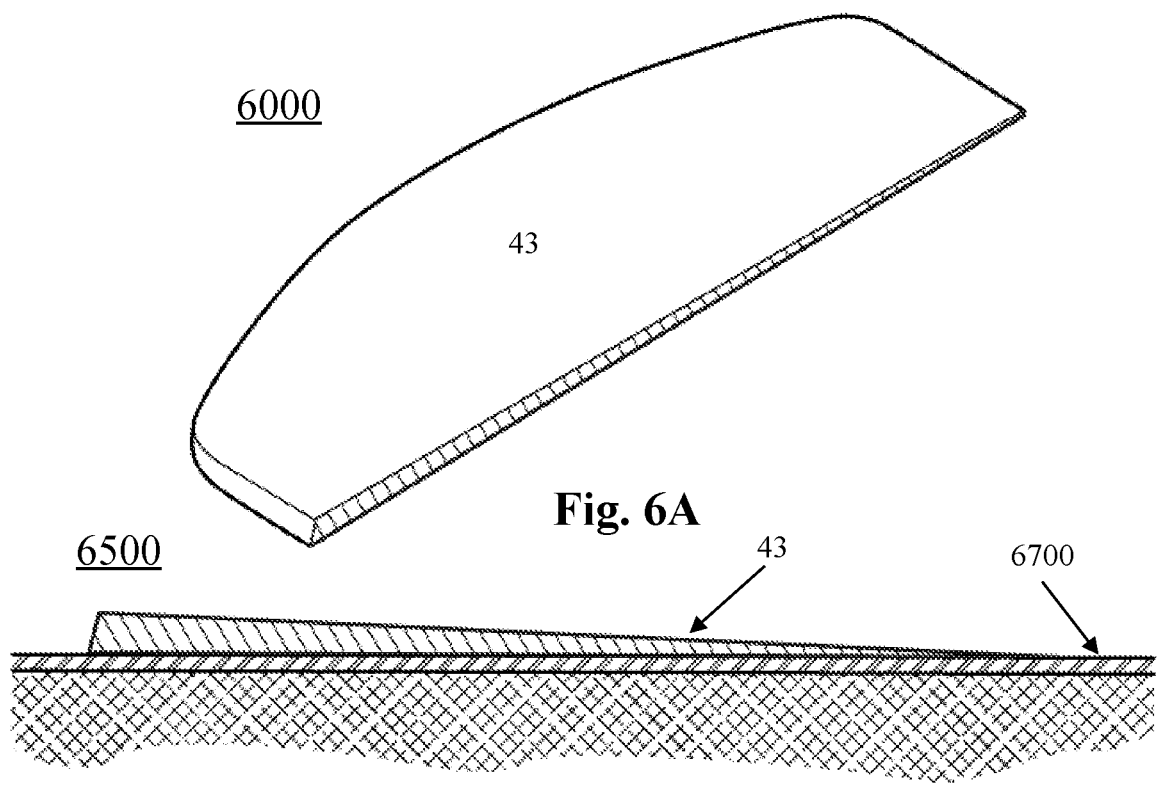
FIG. 6A is a sectional view 6000 (see FIG. 5A) of exemplary disc 43 of FIG. 4.
FIG. 6B is a sectional view an exemplary system 6500.

FIG. 6A is a sectional view 6000 (see FIG. 5A) of exemplary disc 43 of FIG. 4.

FIG. 6B is a sectional view of an exemplary system 6500, which illustrates and exemplary disc 43 (of FIG. 6A) coupled to a surface of a watercraft 6700. As illustrated, disc 43 is tapered.

Figure 7:
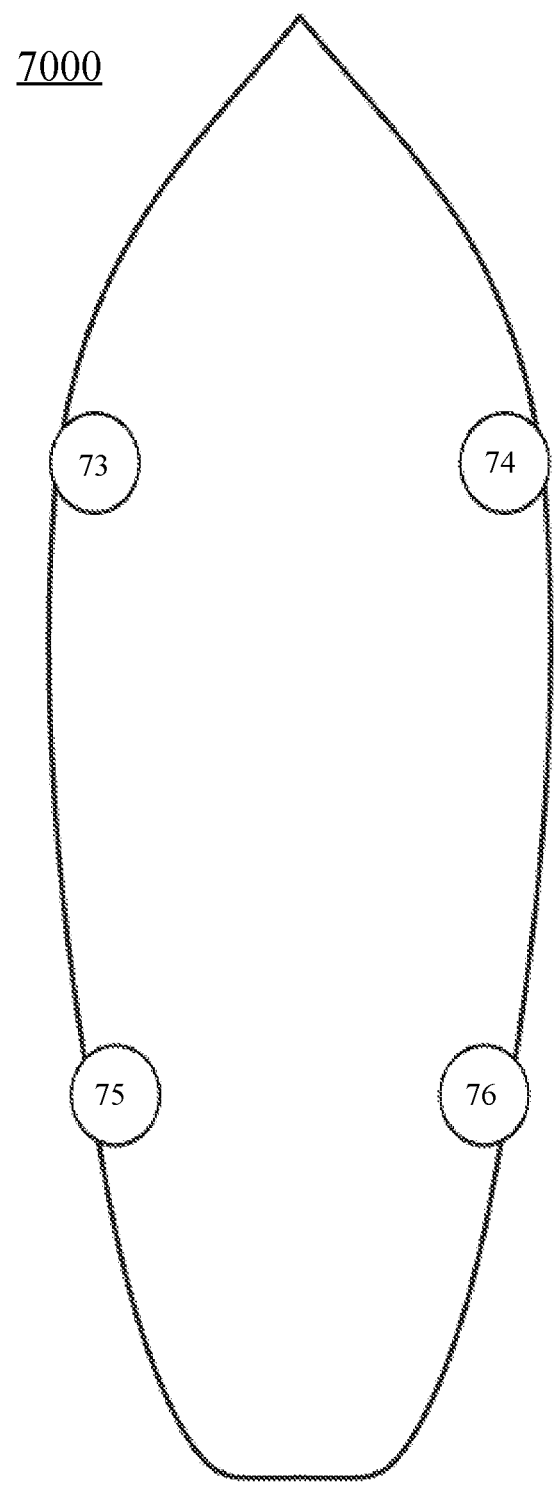
FIG. 7 is a bottom view of an exemplary embodiment of a system 7000.
Figure 8A:
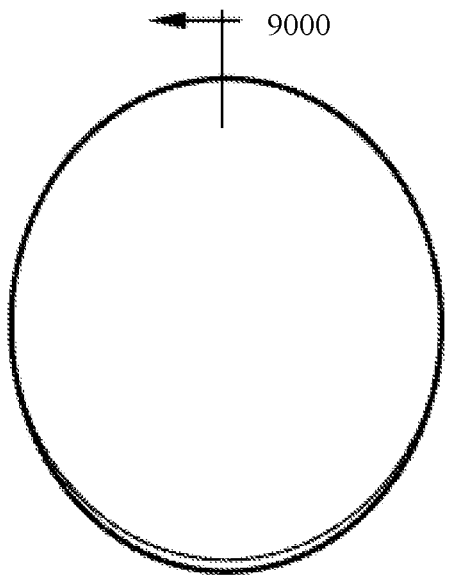
FIGS. 8A, 8B, 8C and 8D are top views of exemplary discs 73, 74, 75, and 76 respectively of FIG. 7.
Figure 8B:
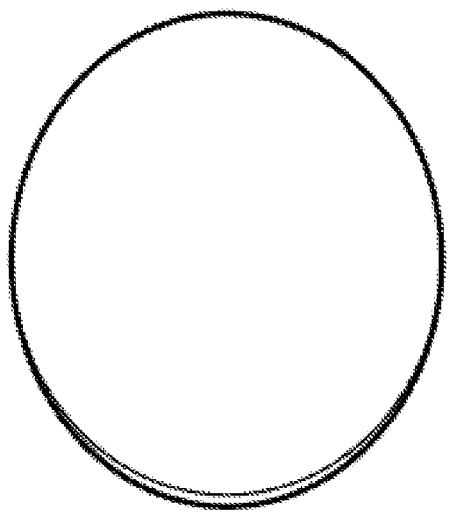
Figure 8C:
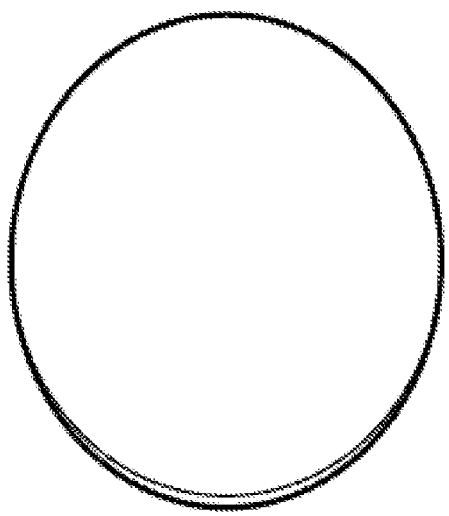
Figure 8D:
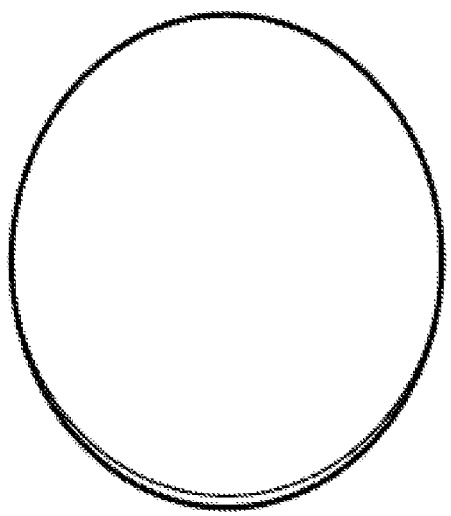

FIG. 7 is a bottom view of an exemplary embodiment of a system 7000, which comprises a surfboard with exemplary discs 73, 74, 75, and 76 installed thereon.

FIGS. 8A, 8B, 8C and 8D are top views of exemplary discs 73, 74, 75, and 76 respectively of FIG. 7.

Figure 9A:
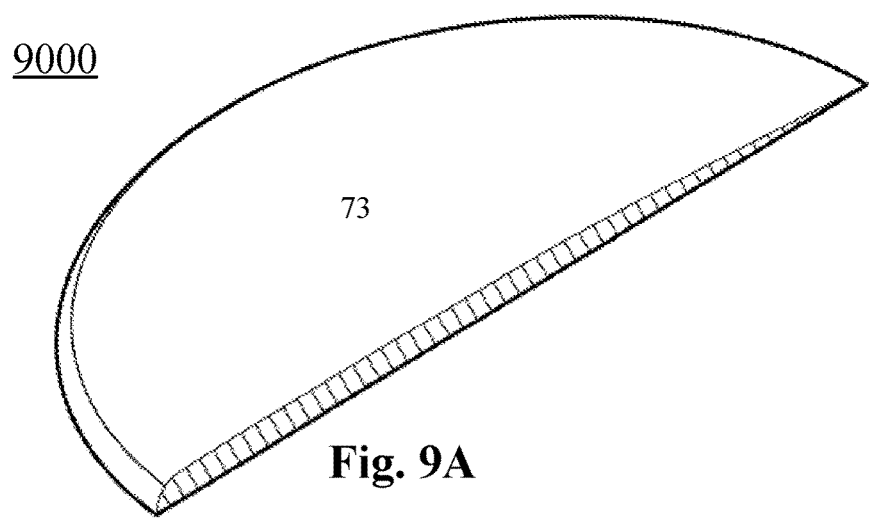
FIG. 9A is a sectional view 9000 (see FIG. 8A) of exemplary disc 73 of FIG. 7.

FIG. 9A is a sectional view 9000 (see FIG. 8A) of exemplary disc 73 respectively of FIG. 7.

Figure 9B:
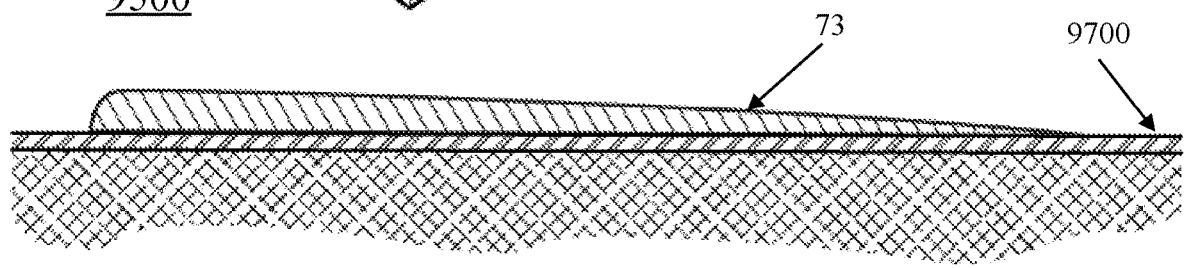
FIG. 9B is a sectional view an exemplary system 9500.

FIG. 9B is a sectional view an exemplary system 9500, which illustrates and exemplary disc 73 (of FIG. 9A) coupled to a surface of a watercraft 9700. As illustrated, disc 73 is tapered.

Figures 10A, 10B, 10C:
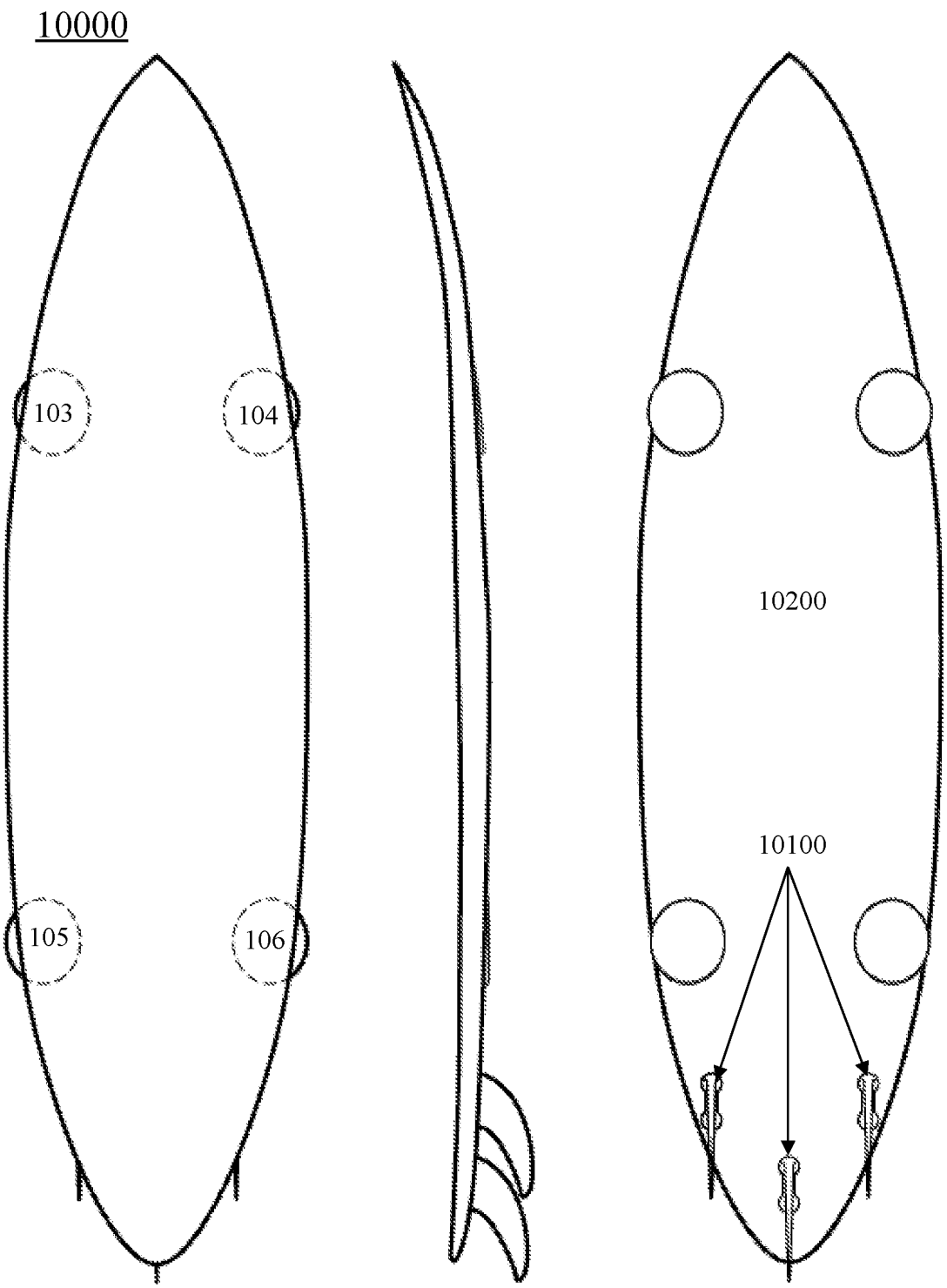
FIG. 10A is a top view of an exemplary embodiment of a surfboard 10000.
FIG. 10B is a side view of an exemplary embodiment of a surfboard 10000.
FIG. 10C is a bottom view of an exemplary embodiment of a surfboard 10000.

FIG. 10A is a top view of an exemplary embodiment of a surfboard 10000, which comprises discs 103, 104, 105, and 106

FIG. 10B is a side view of an exemplary embodiment of a surfboard 10000.

FIG. 10C is a bottom view of an exemplary embodiment of a surfboard 10000, which illustrates a set of fins 10100 coupled to a surface 10200 of surfboard 10000.

Figure 11:
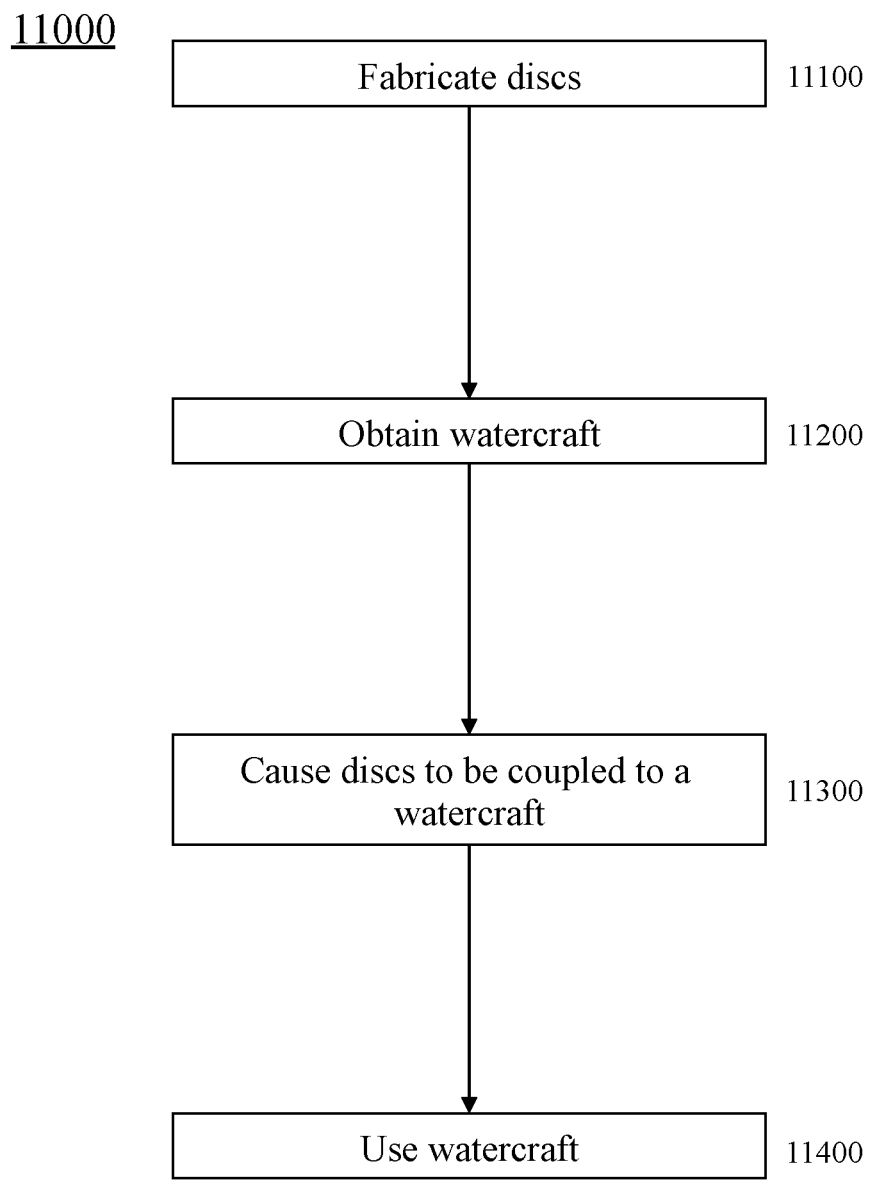
FIG. 11 is a flowchart of an exemplary embodiment of a method 11000.

FIG. 11 is a flowchart of an exemplary embodiment of a method 11000. At activity 11100, discs can be fabricated. For example, discs can be fabricated from, and/or comprise, wood, plastic, polymer, and/or aluminum, etc. Each of the discs can define one or more apertures via which the discs can be coupled to a watercraft.

At activity 11200, a first watercraft can be obtained. At activity 11300, certain exemplary embodiments can cause the discs can be coupled to the first watercraft, such as via a plurality of fasteners. When the plurality of discs is coupled to the first watercraft, each of the plurality of discs deflects a flow of water along the first watercraft such that a partial hydrodynamic lift results as the first watercraft moves across a water surface compared to a second watercraft, wherein the second watercraft not coupled to discs. At activity 11400 the surfboard can be used.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapter—a device used to effect operative compatibility between different parts of one or more pieces of an apparatus or system.

and/or—either in conjunction with or in alternative to.

apparatus—an appliance or device for a particular purpose can—is capable of, in at least some embodiments.

cause—to produce an effect.

circular—having a form defining at least part of a circle, having a round portion.

compared to—examined in relation to.

comprising—including but not limited to.

configure—to make suitable or fit for a specific use or situation.

connect—to join or fasten together.

constructed to—made to and/or designed to.

convert—to transform, adapt, and/or change.

couple—to link in some fashion.

coupleable—capable of being joined, connected, and/or linked together.

create—to bring into being.

cross-section—an intersection of a 3-dimensional body with a plane.

curvilinear—comprising or bounded by curved lines.

define—to establish the outline, form, or structure of deflect—to turn something aside especially from a prior course or direction.

deflector—a plate or other attachment, which deflects a flow of air, water, and/or heat etc. as an object moves through a fluid.

determine—to obtain, calculate, decide, deduce, and/or ascertain.

device—a machine, manufacture, and/or collection thereof.

disc—a thin flat or tapered plate and/or object, which can be of a partially circular or similar shape.

dynamic—a force that stimulates change, progress, and/or motion.

edge—an outside limit of an object, area, or surface.

fastener—one (or more) restraints that attach to, extend through, penetrate, and/or hold something. For example, a fastener can be one (or more) bolt and nut assembly, rivet, weldment, nail, screw, peg, staple, clip, buckle, clasp, clamp, hook and loop assembly, adhesive, and/or plastic push rivet, etc.

flow—movement of fluid.

friction—a force resisting a relative motion of solid surfaces, fluid layers, and material elements sliding against each other.

functional—capable of serving a particular purpose for which something was designed.

higher—at a greater elevation above a surface relative to the center of the earth.

hydro—a combining phrase meaning water used in the formation of compound words.

hydrodynamic lift—a force that is substantially perpendicular to a movement of a fluid.

install—to connect or set in position and prepare for use.
integrity—a quality of being unimpaired in function, sound, and/or steadfast; a condition of being free from defects of flaws.
lift—to move or bring upward in elevation relative to the earth's surface.
may—is allowed and/or permitted to, in at least some embodiments.
method—a process, procedure, and/or collection of related activities for accomplishing something.
move—to go or pass to another place or in a certain direction.
over—on a surface of.
parallel—substantially a same distance apart and generally not converging or diverging.
partial—of or relating to a portion of something rather than the whole
plurality—the state of being plural and/or more than one.
predetermined—established in advance.
provide—to furnish, supply, give, and/or make available.
receive—to get as a signal, take, acquire, and/or obtain.
relative—in reference to a definable object or location.
ride—to float on a water surface.
set—a related plurality.
substantially—to a great extent or degree.
support—to bear the weight of, especially from below.
surface—the outer boundary of an object or a material layer constituting or resembling such a boundary.
surfboard—an elongated platform used in the sport of surfing.
system—a collection of mechanisms, devices, machines, articles of manufacture, processes, data, and/or instructions, the collection designed to perform one or more specific functions.
taper—to become progressively smaller toward one end.
via—by way of and/or utilizing.
water—H$_2$O.
watercraft—a water-borne vehicle such as a boogie board, bodyboard, surfboard, wave board, ship, boat, and/or hovercraft, etc.
weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;
no characteristic, function, activity, or element is "essential";
any elements can be integrated, segregated, and/or duplicated;
any activity can be repeated, any activity can be performed by multiple entities, and/or any activity can be performed in multiple jurisdictions; and
any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a plurality of discs coupleable to a first surfboard, wherein, when the plurality of discs is coupled to the first surfboard, each of the plurality of discs deflects a flow of water along the first surfboard such that the first surfboard rides higher relative to a water surface compared to a second surfboard not coupled to discs, wherein:
each of the plurality of discs has a cross section that comprises two substantially linear edges that meet at substantially right angles; and
a curvilinear edge that meets each of the two substantially linear edges, the curvilinear edge substantially lacking any linear portion.

2. The system of claim 1, further comprising:
the first surfboard.

3. The system of claim 1, wherein:
the plurality of discs creates a partial hydrodynamic lift as the surfboard moves on water.

4. The system of claim 1, wherein:
the plurality of discs cause the system to have less friction moving through water as compared to the second surfboard not coupled to discs.

5. The system of claim 1, wherein:
each of the plurality of discs is partially circular.

6. The system of claim 1, wherein:

each of the plurality of discs comprises three edges, wherein one of the three edges substantially conforms in shape to an edge of the first surfboard when installed on the surfboard.

7. The system of claim 1, wherein:

each of the plurality of discs comprises a curvilinear edge.

8. The system of claim 1, wherein:

each of the plurality of discs has a tapered cross-section.

9. The system of claim 1, wherein:

the plurality of discs comprises four discs spaced over a surface of the surfboard.

10. A system comprising:

a plurality of discs coupleable to a first watercraft, wherein, when the plurality of discs is coupled to the first watercraft, each of the plurality of discs deflects a flow of water along the first watercraft such that a partial hydrodynamic lift results as the first watercraft moves across a water surface compared to a second watercraft, the second watercraft not coupled to discs, wherein each of the plurality of discs has a substantially circular cross section.

11. A method comprising:

causing a plurality of discs to be coupled to a first watercraft, wherein, when the plurality of discs is coupled to the first watercraft, each of the plurality of discs deflects a flow of water along the first watercraft such that a partial hydrodynamic lift results as the first watercraft moves across a water surface compared to a second watercraft, the second watercraft not coupled to discs, wherein each of the plurality of discs has a substantially circular cross section.

\* \* \* \* \*